United States Patent
Rullan et al.

(10) Patent No.: US 10,229,103 B2
(45) Date of Patent: Mar. 12, 2019

(54) DATA GRID COMPONENTS

(71) Applicant: Oracle International Corporation, Redwood Shores, CA (US)

(72) Inventors: Chris Rullan, Cambridge, MA (US); Hendrik van den Broek, Lexington, MA (US); Blake Sullivan, Redwood City, CA (US); Max Starets, Lexington, MA (US); Chadwick Chow, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 239 days.

(21) Appl. No.: 15/247,857

(22) Filed: Aug. 25, 2016

(65) Prior Publication Data

US 2018/0060292 A1 Mar. 1, 2018

(51) Int. Cl.
*G06F 17/00* (2006.01)
*G06F 17/24* (2006.01)
*G06F 17/21* (2006.01)

(52) U.S. Cl.
CPC .......... *G06F 17/246* (2013.01); *G06F 17/211* (2013.01)

(58) Field of Classification Search
None
See application file for complete search history.

(56) References Cited

U.S. PATENT DOCUMENTS

| | | | |
|---|---|---|---|
| 2005/0005243 A1* | 1/2005 | Olander | G06F 3/0482 715/747 |
| 2005/0198201 A1* | 9/2005 | Bohn | H04L 12/6418 709/218 |
| 2006/0015804 A1* | 1/2006 | Barton | G06F 17/246 715/213 |
| 2006/0015846 A1* | 1/2006 | Fraleigh | G06F 3/0481 717/109 |
| 2007/0061714 A1* | 3/2007 | Stuple | G06F 17/218 715/235 |
| 2007/0157081 A1* | 7/2007 | Hara | G06F 3/0485 715/235 |
| 2007/0157082 A1* | 7/2007 | Green | G06F 17/30873 715/234 |
| 2012/0233312 A1* | 9/2012 | Ramakumar | G06Q 10/101 709/224 |
| 2013/0139109 A1* | 5/2013 | Kim | G06F 3/04883 715/835 |

(Continued)

OTHER PUBLICATIONS

InDesign, InDesign Help / Table and cell styles, Adobe, Retrieved: Mar. 27, 2014 (Year: 2014).*

*Primary Examiner* — Howard Cortes
(74) *Attorney, Agent, or Firm* — Trellis IP Law Group, PC

(57) ABSTRACT

A data grid software component has data cells with a style that may be template-based or individual. A data cell may include a software component to show and interact with a bitmap, a graph, a chart, streaming graphics, or streaming bitmaps. The data grid may have footers, headers, and corner cells each capable of holding another software component to show and interact with several data forms. A header, a footer, and a corner cell can each have a style that is template-based or individual. Headers and footers may have multiple levels. Header parts and footer parts at different levels may have a style that is template-based or individual.

18 Claims, 7 Drawing Sheets

| | 1 | 2 | May 31 2016 | 4 | |
|---|---|---|---|---|---|
| 1 | 401.1.1 | 401.1.2 | 401.1.3 | 401.1.4 | ∧ |
| 2 | 401.2.1 | 401.2.2 | 401.2.3 | 401.2.4 | |
| 3 | | 401.3.2 | 401.3.3 | 401.3.4 | |
| 4 | 401.4.1 | 401.4.2 | 401.4.3 | 401.4.4 | |
| 5 | 401.5.1 | 401.5.2 | 401.5.3 | | |
| 6 | 401.6.1 | 401.6.2 | 401.6.3 | | |
| 7 | 401.7.1 | 401.7.2 | 401.7.3 | | ∨ |

400, 402.3, 401.3.1

(56) References Cited

U.S. PATENT DOCUMENTS

| | | | |
|---|---|---|---|
| 2013/0167080 A1* | 6/2013 | Ari | G06F 3/0481 |
| | | | 715/801 |
| 2013/0262974 A1* | 10/2013 | Anstis | G06F 17/246 |
| | | | 715/217 |
| 2014/0040724 A1* | 2/2014 | Krueger | G06F 17/212 |
| | | | 715/234 |
| 2015/0269747 A1* | 9/2015 | Hogan | G06T 7/408 |
| | | | 345/593 |
| 2016/0041698 A1* | 2/2016 | Tkach | G06F 3/0482 |
| | | | 715/765 |
| 2016/0077686 A1* | 3/2016 | Cosio | H04N 21/42204 |
| | | | 715/825 |
| 2017/0147173 A1* | 5/2017 | Schmidt | G06F 3/0482 |

* cited by examiner

| 101.1.1 | 101.1.2 | 101.1.3 | 101.1.4 | 101.1.5 |
|---|---|---|---|---|
| 101.2.1 | 101.2.2 | 101.2.3 | 101.2.4 | 101.2.5 |
| 101.3.1 | 101.3.2 | 101.3.3 | 101.3.4 | 101.3.5 |
| 101.4.1 | 101.4.2 | 101.4.3 | 101.4.4 | 101.4.5 |
| 101.5.1 | 101.5.2 | 101.5.3 | 101.5.4 | 101.5.5 |
| 101.6.1 | 101.6.2 | 101.6.3 | 101.6.4 | |

Fig. 1 – Prior Art

|   | 1 | 2 | 3 | 4 |
|---|---|---|---|---|
| 1 | 201.1.1 | 201.1.2 | 201.1.3 | 201.1.4 |
| 2 | 201.2.1 | 201.2.2 | 201.2.3 | 201.2.4 |
| 3 | 201.3.1 | 201.3.2 | 201.3.3 | 201.3.4 |
| 4 | 201.4.1 | 201.4.2 | 201.4.3 | 201.4.4 |
| 5 | 201.5.1 | 201.5.2 | 201.5.3 | |
| 6 | 201.6.1 | 201.6.2 | 201.6.3 | |
| 7 | 201.7.1 | 201.7.2 | 201.7.3 | |

|  | Sales 2017 * $1k | | | | Forecast 2018 * $ | | | |
|---|---|---|---|---|---|---|---|---|
|  | Q1 | Q2 | Q3 | Q4 | Q1 | Q2 | Q3 | |
| Men | 14.5 | 18.9 | 17.4 | 36.3 | 16.0 | 20.7 | 19.1 | Men |
| Ladies | 35.8 | 46.5 | 43.0 | 89.5 | 39.4 | 51.2 | 47.3 | Ladies |
| Kids | 2.7 | 3.5 | 3.2 | 6.8 | 3.0 | 3.9 | 3.6 | Kids |
| Work | 9.1 | 11.8 | 10.9 | 11.4 | 10.0 | 13.0 | 12.0 | Work |
| Outdoor | 3.1 | 8.5 | 3.7 | 1.6 | 3.4 | 9.3 | 4.1 | Outdoor |
| Sports | 10.2 | 19.9 | 12.2 | 12.8 | 11.2 | 21.9 | 13.5 | Sports |
| Winter | 1.6 | 0.0 | 0.2 | 4.0 | 1.8 | 0.0 | 0.2 | Winter |
| TOTAL | 77.0 | 109.1 | 90.7 | 162.2 | 84.7 | 120.0 | 99.7 | TOTAL |

Fig. 5

DATA GRID COMPONENTS

BACKGROUND

The present invention is in the area of computer graphical user interfaces (GUIs). It can be used in applications that display tabular data in a scrollable grid, allowing user interaction to update the tabular data. Embodiments of the invention include methods to display and interact with tabular data, tangible non-transitory media including such methods, and computer systems executing such methods.

GUI developer uses software components (software components are also called controls or widgets) to build a GUI for a software application. One of the most basic software components is a window, a rectangular area that has a width and a height, a position on the computer screen, and one or more rendering properties, such as a color. A window can contain other software components, but it can also be used as the basis for a more complex software component, such as a button, a text field, a dropdown box, a menu, a scrollbar, etc.

Data grids are software components used to display tabular data, often in a text form. The tabular data may be presented in an X-direction (a row), in a Y-direction (a column), and a Z-direction—usually in the form of multiple tabs, each containing a field containing rows and columns. Typically, rows are preceded by a row header identifying the row location and columns are preceded by a column header identifying the column location. For example, Microsoft Excel displays worksheets (data grids) in which row headers show row numbers (1 . . . 1,048,576), and column headers show column letter combinations (A . . . XFD).

Conventional data grids are primarily directed towards displaying text and numbers. However, advanced data grids, including those used in Microsoft Excel, OpenOffice Calc, LibreOffice Calc and those available in GUI development environments such as NetBeans, Qt, etc., have many more capabilities, including formatting of text fonts, rendering backgrounds of individual cells or cell ranges, overlaying the data grid with bitmaps, vector-based graphics or other objects, populating an individual cell with a widget such as a dropdown box, and even populating an individual cell with a graph. Navigation can be an issue. For example, using the Tab and arrow keys, an Excel user can either navigate the functions in the ribbon, or navigate the cells of a data grid, or navigate objects overlaying the data grid. Use of the Alt and ESC keys allows some means of switching between different types of navigation, but no simple intuitive way is provided to navigate from a cell to an object overlaying a worksheet using just a keyboard.

Embodiments of the invention address issues including rendering performance, navigation, cell style, and provide header innovation.

SUMMARY

Embodiments of the invention include methods to display and interact with tabular data in a scrollable grid and to create software capable thereof, tangible non-transitory media including such methods, and computer systems executing such methods. The simplest way to present and interact with the tabular data is in the form of text. The tabular data may be presented in at least a first direction, but is most often arranged in an X-direction (a row) and a Y-direction (a column). A computer graphical user interface (GUI) developer uses software components (software components are also called controls or widgets) to build a GUI for a software application. Data grids are software components to display and interact with tabular data on a computer screen.

Embodiments of the invention provide greater utility to both GUI developers and end users by addressing issues including rendering performance, navigation, cell style, and providing header innovation.

In a first aspect, an embodiment of the invention includes a method for creating a data grid software component for display in a graphical user interface (GUI) on a computer's screen. The method comprises three steps: (a) creating a software class including a container window; (b) instantiating a data grid object from the software class; and (c) populating the data grid object with two or more data cell windows and displaying the data grid object in the GUI. The method has several limitations: (i) the software class is configured to include two or more data cell windows, displayable in a grid organization in the container window; (ii) each data cell window is included in a data cell; (iii) a first data cell includes a first style property to define a first display style of a first data cell window included in the first data cell; (iv) the first style property is configured to include one or more of a first individual value and a first template value; and (v) the first data cell window is capable of displaying a first data value included in the first data cell.

In further embodiments, the software class may comprise a footer carrying a text label and/or a second software component. The second software component may be adapted to show and interact with one or more of text, a bitmap, a graph, a chart, streaming graphics, and a streaming bitmap and wherein display data is received or retrieved from one or more of a software program, a database, a data file, and a data stream. The footer may include a footer style property adapted to include one or more of an individual footer style value and a template footer style value. The footer may have multiple levels.

In yet further embodiments, the software class may comprise a header configured to include a third software component. The third software component may be adapted to show and interact with one or more of a bitmap, a graph, a chart, streaming graphics, and a streaming bitmap and wherein display data is received or retrieved from one or more of a software program, a database, a data file, and a data stream. The header may include a header style property adapted to include one or more of an individual header style value and a template header style value. The header may have multiple levels.

In even further embodiments, the software class may comprise a corner cell configured to include one or more of a text label and a fourth software component. The fourth software component may be adapted to show and interact with one or more of text, a bitmap, a graph, a chart, streaming graphics, and a streaming bitmap and wherein display data is received or retrieved from one or more of a software program, a database, a data file, and a data stream. The corner cell may include a corner cell style property adapted to include one or more of an individual corner cell style value and a template corner cell style value.

In a second aspect, embodiments of the invention include a tangible, non-transitory computer-readable information storage medium including instructions adapted to direct a computer to display a data grid in a GUI, comprising at least part of the methods described above.

In a third aspect, embodiments of the invention include a system capable of executing at least part of the methods described above.

A further understanding of the nature and the advantages of particular embodiments disclosed herein may be realized by reference of the remaining portions of the specification and the attached drawings.

BRIEF DESCRIPTION OF THE DRAWINGS

The invention will be described with reference to the drawings, in which:

FIG. 1 illustrates a conventional basic data grid example;

FIG. 2 illustrates another conventional data grid example;

FIG. 3 illustrates a data grid with header styles and data cell styles according to an embodiment of the invention;

FIG. 4 illustrates a data grid with a header and a data cell containing objects according to an embodiment of the invention;

FIG. 5 illustrates a data grid with multi-level headers and footers according to an embodiment of the invention;

DETAILED DESCRIPTION

Figure 6:
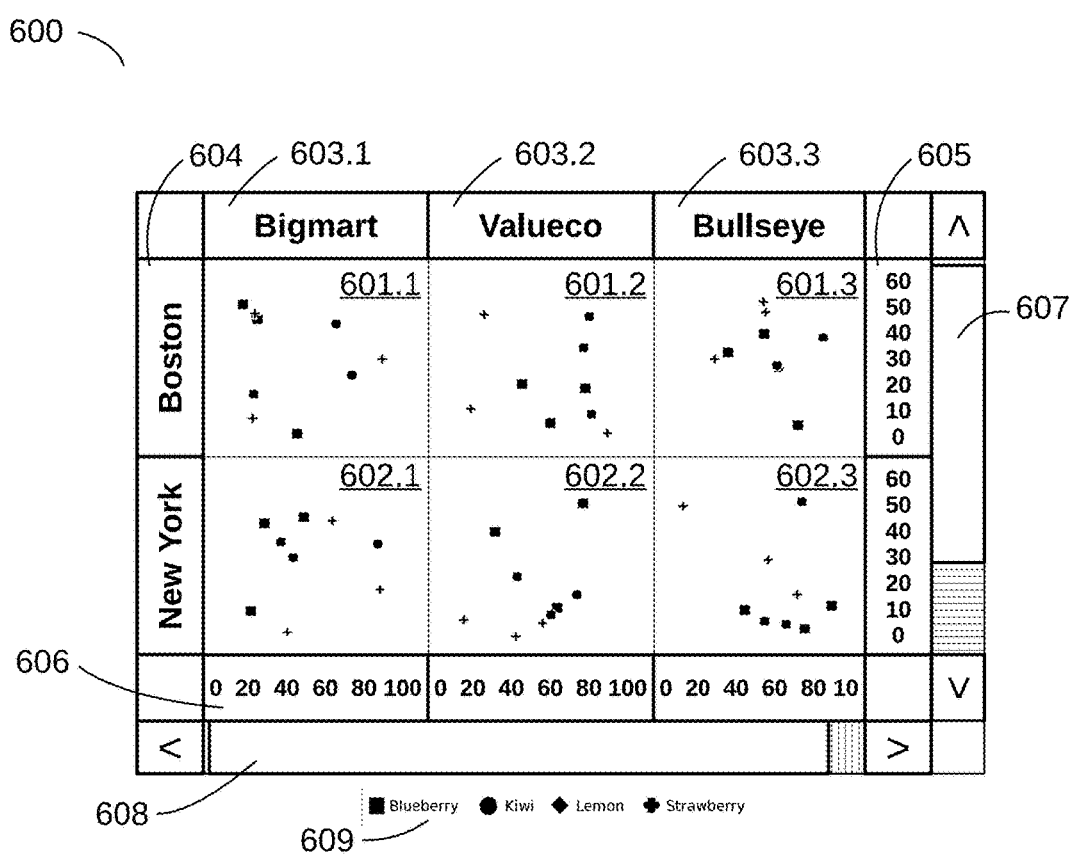
FIG. 6 illustrates a data grid with graphs, and footers showing data scales for the graphs according to an embodiment of the invention.

Embodiments of the invention include methods to display and interact with tabular data in a scrollable grid and to create software capable thereof, tangible non-transitory media including such methods, and computer systems executing such methods. The simplest way to present and interact with the tabular data is in the form of text. The tabular data may be presented in at least a first direction, but is most often arranged in an X-direction (a row) and a Y-direction (a column). A computer graphical user interface (GUI) developer uses software components (software components are also called controls or widgets) to build a GUI for a software application. Data grids are software components to display and interact with tabular data on a computer screen.

Embodiments of the invention provide greater utility to both GUI developers and end users by addressing issues including rendering performance, navigation, cell style, and providing header innovation.

FIG. 1 illustrates a conventional basic data grid example 100. Data grid 100 includes window 102, which acts as overall container of the software component, and which may act as a background canvas. Window 102 includes data cells 101.1.1 through 101.6.4, here arranged in 6 rows and five columns. A first row includes data cells 101.1.1 . . . 101.1.5, etc., and a first column includes data cells 101.1.1 . . . 101.6.1. Data cells in the fifth column (101.1.5 . . . 101.5.5) are only partially displayed. Horizontal scrollbar 104 allows a user to scroll horizontally. Conventional data grids may offer a predetermined number of data cells, arranged in a fixed order of rows and columns, or a GUI developer or the application in which a data grid is used may determine the number of data cells, rows, and columns. Example data grid 100 includes 29 data cells, showing that not all rows or columns need to have the same number of data cells. Data cells typically span one row and one column. However, many conventional data grids allow data cells to span multiple adjacent rows and/or columns. Therefore, a data grid that includes six rows and five columns may have any number of data cells from 0 to 30. Each data cell (a data structure) typically includes a rectangular window (the data cell window). The data structure represents cell data and may contain aspects of the cell data itself as well as contextual information of its visual presentation and the types of user interaction that are permitted. The data cell window may display parts or all of the cell data, for example in the form of a text or a number. To display cell data or interact with the cell data, a cell window may also include another software component. For example, when a user wants to change cell data that is limited to specific values in a list, the cell window may include a dropdown box software component to show permitted list values. When the user picks a new value, the cell data is changed to the new value.

FIG. 2 illustrates another conventional data grid example 200. Data grid 200 includes a grid of more than seven rows, and four columns. Only seven rows are shown, and vertical scrollbar 204 allows a user to scroll to the remaining rows. Data grid 200 shows 25 data cells, items 201.1.1 through 201.7.3. It additionally shows column headers 202 and row headers 203. When a user scrolls vertically, with vertical scrollbar 204, column headers 202 remain in place whereas the data cells move vertically in accordance with vertical scrollbar 204. Row headers 203 scroll along with the data cells. When a user scrolls horizontally, using a horizontal scrollbar (not shown), row headers 203 remain in place whereas column headers 202 and the data cells move horizontally in accordance with the horizontal scrollbar. Data grids typically distinguish headers from data cells by using a different visual style or formatting. For example, headers in data grid 200 have thicker boundary lines and a bold typeface.

Figures 3, 4:
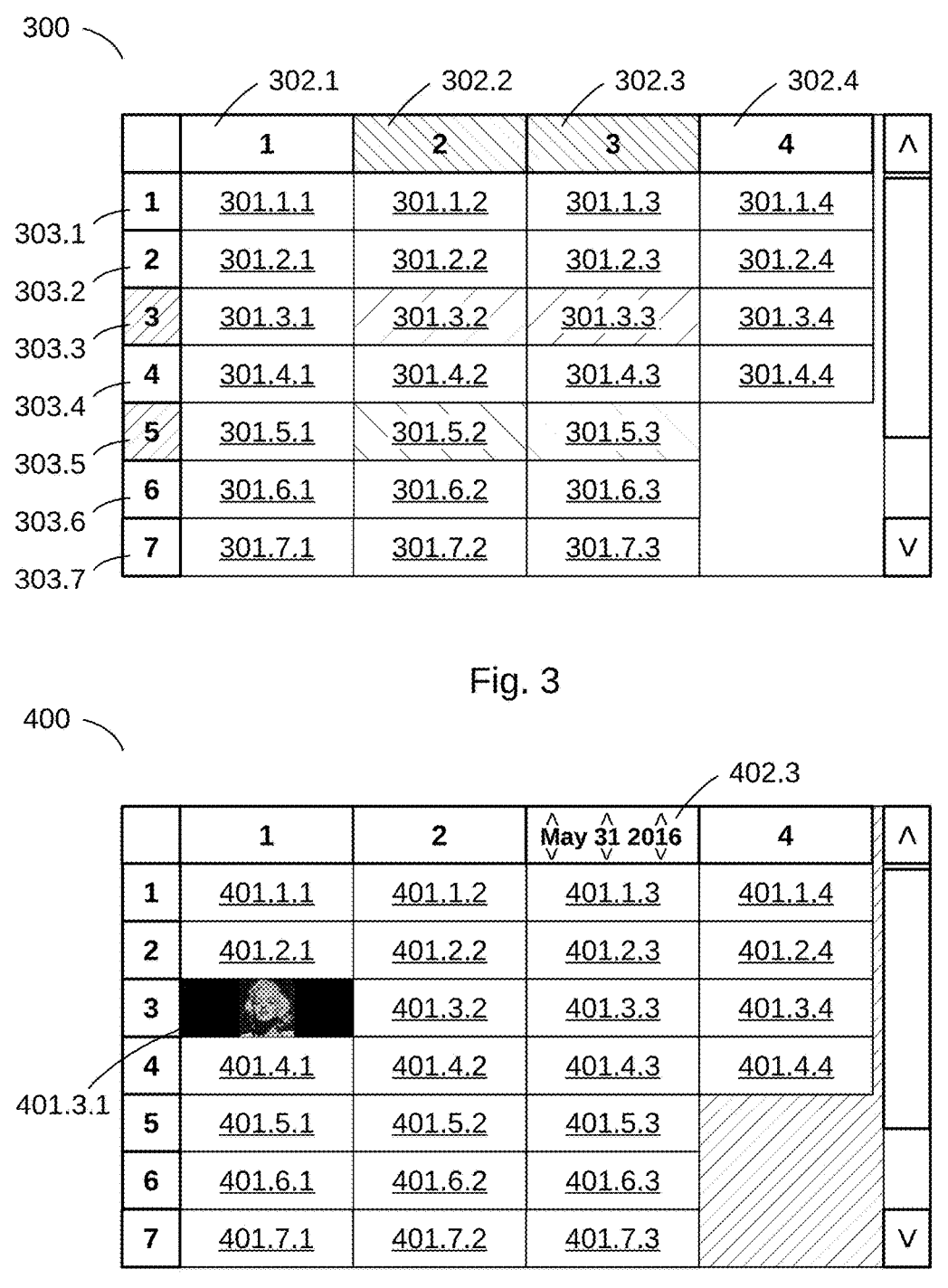

FIG. 3 illustrates a data grid 300 with header styles and data cell styles according to an embodiment of the invention. Data grid 300 includes data cells 301.1.1 . . . 301.7.3, column headers 302.1-302.4, and row headers 303.1-303.7. Whereas data cells in conventional data grids need to each be initialized with various elements of the visual appearance, embodiments of the invention may include data cells and/or header cells whose visual appearance is at least partially determined by one or more templates. Embodiments may capture one or more styles each in a template, and headers or data cells may refer to a style, or a combination of styles, to determine their visual appearance. Additionally, they may carry individual style information that may at least partially replace or complement the template based style information.

FIG. 3 shows column headers 302.1 and 302.4 in a first header style, and column headers 302.2 and 302.3 in a second header style. It shows row headers 303.1, 303.2, 303.4, 303.6 and 303.7 in the first header style, and row headers 303.3 and 303.5 in a third header style. In this example, the different styles are illustrated by different background rendering of the headers. FIG. 3 further shows most data cells in a first data cell style (with white background), whereas data cells 301.3.2 and 301.3.3 are shown in a second data cell style, and data cells 301.5.2 and 301.5.3 are shown in a third data cell style.

Embodiments may define a data grid in any of a large variety of programming languages and data formats. For example, some GUI developers may prefer to work in a compiled language, such as Java or C++, and other GUI developers may prefer to work in a script language, such as JavaScript or Python. Similarly, software components may be compiled, or interpreted. They may be used from a pre-compiled library, or they may be borrowed from a non-operating system dependent GUI technology, such as hypertext markup language (HTML). The latter is very convenient for defining styles. For example, an embodiment may implement a data cell or a header as a <DIV> element. The format of an individual DIV element may directly be programmed in one or more style statements. The style for multiple DIV elements may be programmed as a class (a style template not to be confused with a software class as used elsewhere in this document), which may be defined in a cascading style sheet (CSS file). An embodiment can change all data cells and/or headers in a class simultaneously by modifying the class definition, and it can change all data cells and/or headers in multiple classes simultaneously by replacing a CSS file.

FIG. 4 illustrates a data grid 400 with a header 402.3 and a data cell 401.3.1 containing objects according to an embodiment of the invention. Data grid 400 includes data cells 401.1.1 . . . 401.7.3. Data cell 401.3.1 includes a bitmap. In one embodiment, the data cell window may contain a software component (an object) that is optimized for display of bitmaps, for example an <IMG> element in an HTML system or a graphics view widget in any GUI development environment. In another embodiment, the bitmap may be directly painted onto the data cell window, for example a <DIV> element in HTML. In a further embodiment, the bitmap may be directly painted onto the data cell window as the result of usage of a class or style template, as discussed above with reference to FIG. 3.

Column header 402.3 includes a date picker software component. The date picker shows a date (May 31, 2016) including a month, a day, and a year, and including controls to spin each of these up or down. Software developers use date pickers, and similar software components, to allow a user to enter valid data only. In other words, whereas editing a date in the form of text would allow a user to enter an invalid date, a date picker would only accept valid dates. Conventional data grids do not allow users to edit or modify headers and may not allow developers to fill data cells or headers with objects, such as a software component.

In embodiments, data cells may be configured to include text captions and/or software components, for example configured to show and interact with a date, a time, a graph, a chart, a bitmap, streaming graphics, and a streaming bitmap. Display data may be received and/or retrieved from one or more of a software program, a database, a data file, and a data stream.

Additionally, embodiments may offer improved rendering performance by tying a data entry object to a data cell only once a user clicks on the data cell to start editing the data contained in it. In this manner, when a data grid includes a large range of data cells whose input data must be validated by a software component, only the data cell being edited is burdened with the computational complexity of the software component (object).

FIG. 5 illustrates a data grid 500 with multi-level headers and footers according to an embodiment of the invention. Data grid 500 includes a column of row headers 503 and a column of row footers 504. It further includes a row of multi-level column headers 506 and a row of column footers 507. Corner cells on the crossing of header/footer rows and header/footer columns include bottom left corner cell 508 and bottom right corner cell 509.

In the embodiment, row footers, like row headers, do not respond to a user's horizontal scroll inputs, but they move vertically along with data cells in response to the user's vertical scroll inputs. Similarly, column footers in the embodiment do not respond to the user's vertical scroll inputs, but they move horizontally along with data cells in response to the user's horizontal scroll inputs. In some embodiments, footers may have the same style as headers, or the same style as their corresponding headers, or they may have a different style, or footers or ranges of footers may have individual styles and/or styles based on one or more templates. In further embodiments, individual footer style values may override template footer style values. In the example data grid 500, column footers in column footer row 507, as well as corner cells 508 and 509, feature a different background rendering than multi-level column headers 506.

In some embodiments, headers and/or footers may display text captions, rather than the coordinates of conventional data grids. Footer text captions may be the same as header text captions. For example, row footers 504 display the same captions as row headers 503 ("Men", "Ladies", etc.). Footer text captions may be different than header text captions. For example, column footers 507 display very different captions (77.0, 109.1, etc.) than the corresponding column headers 506 ("Sales 2017*$1 k", "Q1", etc.). Footers may include objects, including software components, graphics views, and any other objects with a visual aspect. In an embodiment, a footer may include a software component configured to show and interact with one or more of a text, a date, a time, a graph, a chart, a bitmap, streaming graphics, and a streaming bitmap; and wherein display data is received or retrieved from one or more of a software program, a database, a data file, and a data stream.

Row 506 shows an example embodiment of multi-level column headers. Row 506 includes two levels: a basic level with granularity equal to the granularity of data cell columns (containing captions "Q1", "Q2", etc.), and a higher level spanning several data cell columns (with captions "Sales 2017*$1 k" and "Forecast 2018*$ . . . "). Whereas example 500 shows multi-level column headers, further embodiments may include multi-level column footers, multi-level row headers, and/or multi-level row footers. Whether headers or footers, or parts thereof, span single rows/columns or multiple rows/columns, each may have an individual style or a template based style, each may have an individual text caption, and each may include objects, including software components, graphics views, and any other objects with a visual aspect. Multi-level headers and footers may have any depth, i.e. any number of levels, and any extent, i.e. they may span any number of rows or columns. Multi-level headers may have a hierarchical structure, which may be driven by a data source.

Embodiments may further include corner cells, of which each may have an individual style or a template based style, each may have an individual text caption, and each may include objects, including software components, graphics views, and any other objects with a visual aspect. In an embodiment, a corner cell may include a software component configured to show and interact with one or more of a text, a date, a time, a graph, a chart, a bitmap, streaming graphics, and a streaming bitmap; and wherein display data is received or retrieved from one or more of a software program, a database, a data file, and a data stream. Example corner cells 508 and 509 are simple, with a style that matches the style of footer row 507, and equal text captions ("TOTAL"). Corner cells do not respond to any user scroll inputs. In embodiments, individual corner cell style values may override template corner cell style values.

Further embodiments may include high-watermark scrolling to avoid the need for a data grid to show a vertical scrollbar in mobile applications. High-watermark scrolling is a scroll policy that adds a set number of rows to the overall data grid height when explicitly requested by a user. This scroll policy is most appropriate when no other page content exists beneath the data grid and the data grid content is also the prevailing page content. In case there is more data to be shown, the embodiment shows a button, icon, or link, for example on the bottom right of the table, that a user can tap or click to show an additional page of entries or to load more data. A data grid embodiment may implement its data structure in a Document Object Model (DOM) as a data hierarchy. If the embodiment includes high-watermark scrolling, it may keep a first page DOM in local memory as it loads a second page or it may keep existing DOM elements in local memory as it loads more data.

Yet further embodiments that implement a DOM may include virtual scrolling. In virtual scrolling, an embodiment keeps the content of local memory as small as possible by removing DOM elements outside of a data grid's view port from local memory.

FIG. 6 illustrates a data grid 600 with graphs, and footers showing data scales for the graphs according to an embodiment of the invention. Data grid 600 includes data cells 601.1-602.3, column headers 603.1-603.3, row headers 604, row footers 605, column footers 606, vertical scroll bar 607, horizontal scroll bar 608, and data comments panel 609.

Data cells 601.1-602.3 each display a graph. As has been mentioned with respect to FIG. 4, some embodiments may paint a graph directly onto a data cell window, whereas in other embodiments a data cell window may include another object, for example a graphics view software component or a widget optimized for displaying graphs. The graphs in data grid 600 may be based on sets of data items that the embodiment retrieves from or receives from a database, data file, or data stream, whereas in yet other embodiments graphs may simply have been frozen in bitmaps. As data comments panel 609 suggests, the graphs compare sales of blueberries, kiwis, lemons, and strawberries in big box stores (column headers 603.1-603.3) in Boston and New York (row headers 604). Column footers 606 show a horizontal scale for the graphs (0-100) and row footers 605 show a vertical scale for the graphs (0-60). Some embodiments may provide the scale as a bitmap. Other embodiments, that allow an end user to resize the data grid, may dynamically generate the scales as they paint the footers on the screen. Besides scale values, some embodiments may display rulers in footers (or headers, as the case may be), or other elements that are meaningful for an end user to interpret the graphs.

Data grid 600 further shows that text elements need not be horizontal. The texts in row headers 604 are vertical, i.e. they have been rotated 90 degrees counter-clockwise. Embodiments may display text in data cells, headers, footers, and/or corner cells rotated any number of degrees.

Figure 7:
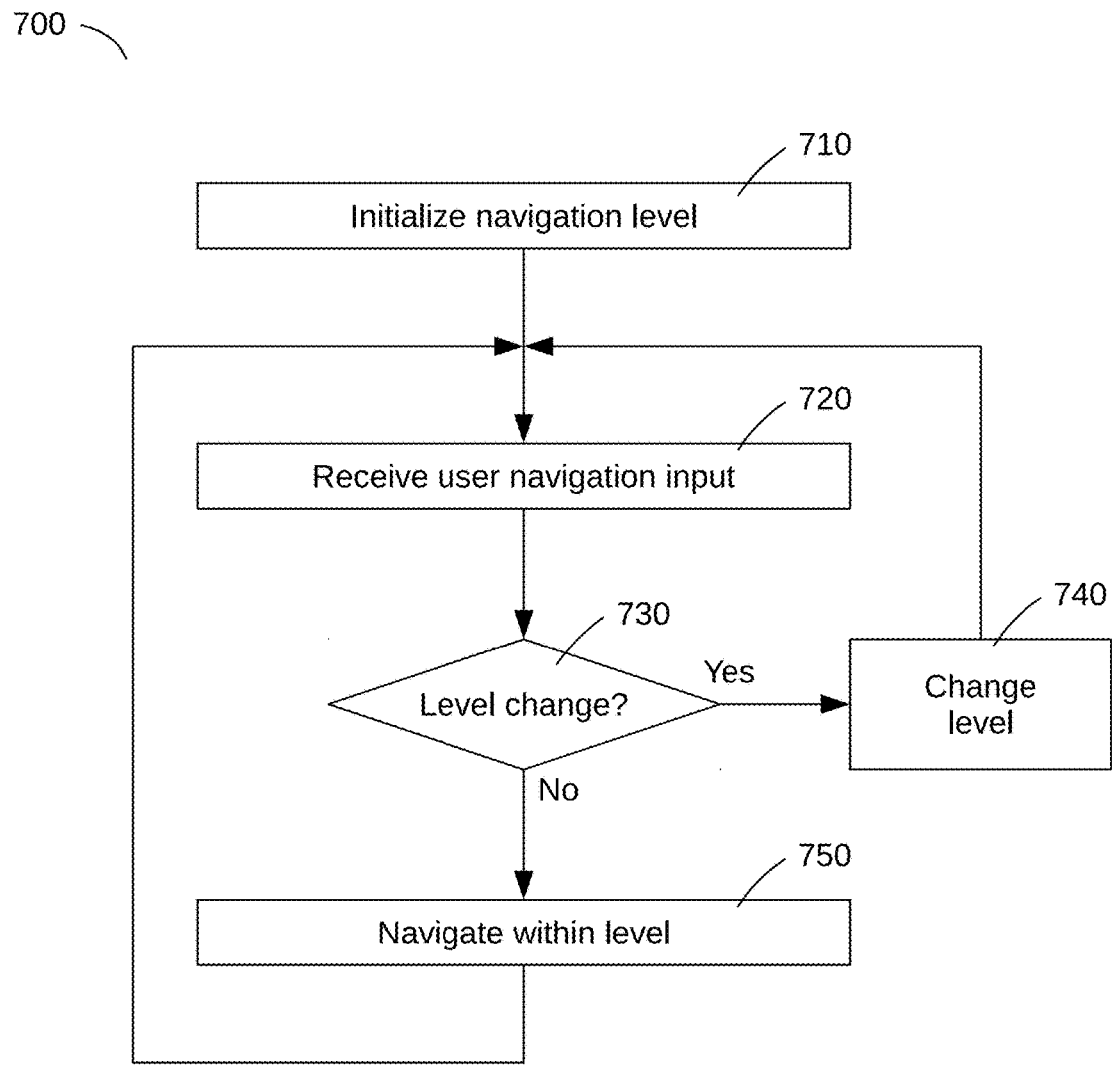
FIG. 7 illustrates a method for navigating a GUI with a data grid according to an embodiment of the invention.

FIG. 7 illustrates a method 700 for navigating a GUI with a data grid according to an embodiment of the invention. The method is based on the notion that two or more levels of navigation exist. The first (and highest) level is navigation within the GUI, where a user may navigate from software component to software component using, for example, the Tab, Shift+Tab, Page Up, Page Down, Home, End, and/or arrow keys. Normally, applications let a user navigate within a tab order sequence of the software components, where the Tab key will navigate to a next software component in the sequence, and Shift+Tab will navigate to a previous software component. The next (second) level is navigation within a selected software component. A common-sense solution would be to limit Tab and Shift+Tab to the highest level of navigation and to use other keys for navigation within the software components. However, within a data grid this is a problem since many users are familiar with Microsoft Excel which uses the Tab and Shift+Tab keys to navigate within a worksheet. Further, in a data grid it must be possible to navigate within a software component that is included in a data cell, or to navigate within a data cell text that is being edited. This introduces at least a third level of navigation. Embodiments of the invention assign two navigation level change keys. For example, the F2 key enables a user to change to a lower level of navigation, and the ESC key enables a user to change to a higher level of navigation. Method 700 includes the following steps.

Step 710—the embodiment initializes the navigation level and initially selected software component. For example, navigation might be initialized at the highest level, and a software component location in the top left corner of an application main window. Or, navigation might be initialized at the second level where the initially selected software component is a data grid. Within the data grid, the embodiment defines a first selected data cell, for example the top left cell.

Step 720—receiving a user navigation input. The user navigation input may include "level up", "level down", "next item", "previous item", "item up", "item down", etc., as per the assigned keys, such as ESC, F2, Tab or right arrow, Shift+Tab or left arrow, up arrow, down arrow, etc. Because of the widespread use of spreadsheets, users are familiar with several more keys and key combinations that facilitate navigation within a data grid and that feel intuitive. All such keys and key combinations are within the ambit and scope of the present invention.

Step 730—determining if the received user navigation input includes a level change command (level up, or level down).

Step 740—upon determining that the received user navigation input includes a level change command, changing the navigation level and returning to step 720.

Step 750—navigating within the level based on the received user navigation input, and returning to step 720. For example, when the received user navigation input includes the command "next item" (for example from the Tab or the right arrow key) and navigation is set at the first level, the embodiment will select a next software component in the tab order. But if navigation is set at the second level, and the selected software component is a data grid, then the embodiment will select a next data cell within the data grid. If navigation is set at a third level, the embodiment may select a next character within a data cell, or may select a next item within a software component contained in a data cell.

Method 700 focuses on user inputs via a keyboard. GUIs support many more types of user inputs (including via a mouse, stylus, screen gestures, voice controls, eye controls, etc.) as well as different keyboard inputs such as Ctrl+<key> or Alt+<key>, where the user inputs may contain complex navigation commands, such as the command to navigate to a specific software component and change navigation level if needed. Support for complex commands is merely an extension of method 700, which remains intact for embodiments of the invention.

Figure 8:
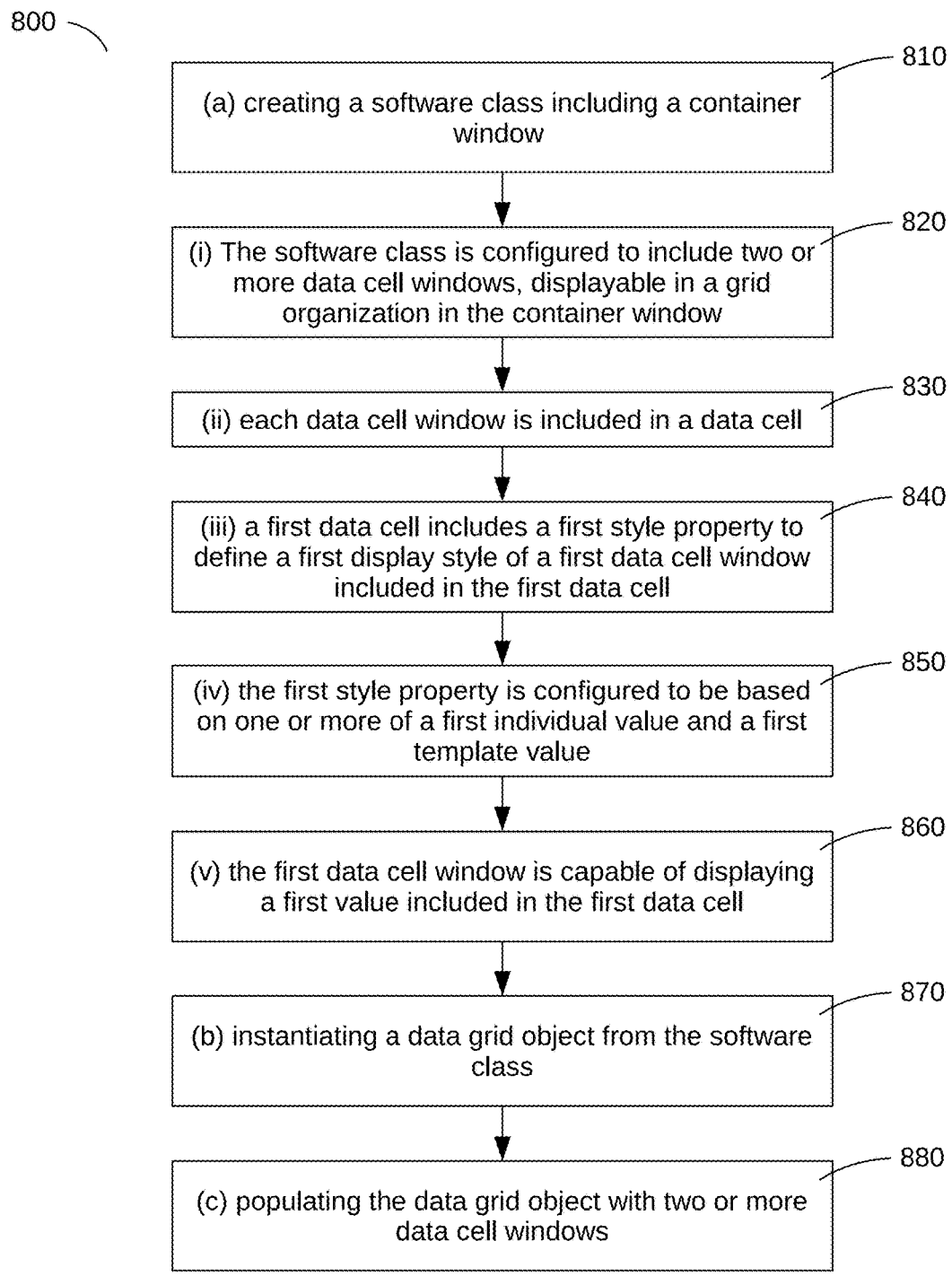
FIG. 8 illustrates a method for creating a data grid software component according to an embodiment of the invention.

FIG. 8 illustrates a method 800 for creating a data grid software component according to an embodiment of the invention. The data grid is for use in a GUI to interact with and visually display data on a computer screen. Method 800 includes the following steps and limitations.

Step 810—creating a software class including a container window. A software class constitutes a software template for an object that may contain functions and properties. Functions and properties may be either public or private. Public functions are mostly used to interface with the class's properties, but they may also be used to act on external variables. Properties, whether public or private, may be as simple as variables, or as complex as other objects and software components, or pointers or references thereto.

Limitation 820—the software class is configured to include two or more data cell windows, displayable in a grid organization in the container window. The grid organization may be in one or more dimensions. Most typically, data cell windows are organized in rows and columns to represent the values included in two-dimensional data tables. However, a data grid may also represent a one-dimensional table (a simple list), a three-dimensional table (multiple pages of two-dimensional tables), a four-dimensional table (multiple books of three-dimensional tables), etc. A data cell window may be as simple as a uniform rectangle to represent empty data, or a text label to represent text or numeric data, or the data cell window may be a container window of another software component, for example one for entering, selecting, or editing textual data, or one for displaying and interacting with complex graphical data.

Limitation 830—each data cell window is included in a data cell. A data cell may be a data structure that includes the data to be displayed, contextual information about the data and the way it is displayed, and the data cell window. It may also include information about how the user may interact with the data, for example whether it is locked or unlocked, the types of data allowed, and whether invalid data is rejected.

Limitation 840—a first data cell includes a first style property to define a first display style of a first data cell window included in the first data cell. The style property may impact many aspects of displaying the data, including background color, foreground color, typeface, font, font effects, font size, positioning, alignment, and any other type of formatting that is common in the art.

Limitation 850—the first style property is configured to be based on one or more of a first individual value and a first template value. The first template may be an external template, prescribing part or all of the aspects of displaying the data, or it may be an internal template that can be selected to replace part or all of the aspects of displaying the data that may come with the class implementation's default values. The first style property may include some element values from the first template, whereas others are overwritten or overridden by individual element values.

Limitation 860—the first data cell window is capable of displaying a first data value included in the first data cell. Embodiments may receive or retrieve the first data from a database, a data file, or a data stream. Embodiments may decode, demodulate, decrypt, process, combine, or manipulate the first data prior to displaying.

Step 870—instantiating a data grid object from the software class. Whereas the software class provides a template, embodiments instantiate an actual data grid software component from the software class for using it in a GUI.

Step 880—populating the data grid object with two or more data cell windows to show at least two data values and displaying the data grid object in the GUI. Populating the data grid enables it to receive or retrieve data for its data cell windows and to display the data to a user, and to receive user inputs to modify the data.

In embodiments, the software class may further comprise a footer configured to include one or more of a text label and another software component. In further embodiments, the software class comprises a corner cell configured to include one or more of a text label and another software component. In yet further embodiments, the software class further comprises a header configured to include another software component.

In some embodiments, the software class further comprises a multi-level header, or a multi-level footer. A multi-level header may include a first level with granularity equal to the granularity of data cell columns or rows, as well as a second and further levels spanning multiple columns or rows. Whether headers or footers, or parts thereof, span single rows/columns or multiple rows/columns, each may have an individual style and/or a template based style, each may have an individual text caption, and each may include objects, including software components, graphics views, and any other objects with a visual aspect.

In embodiments, a data cell may be configured to include one or more of a text label and another software component. The data grid object may include a third data cell window adapted for displaying a graph. And the third data cell window may be adapted for displaying a graph capable of showing data received or retrieved from a database.

Figure 9:
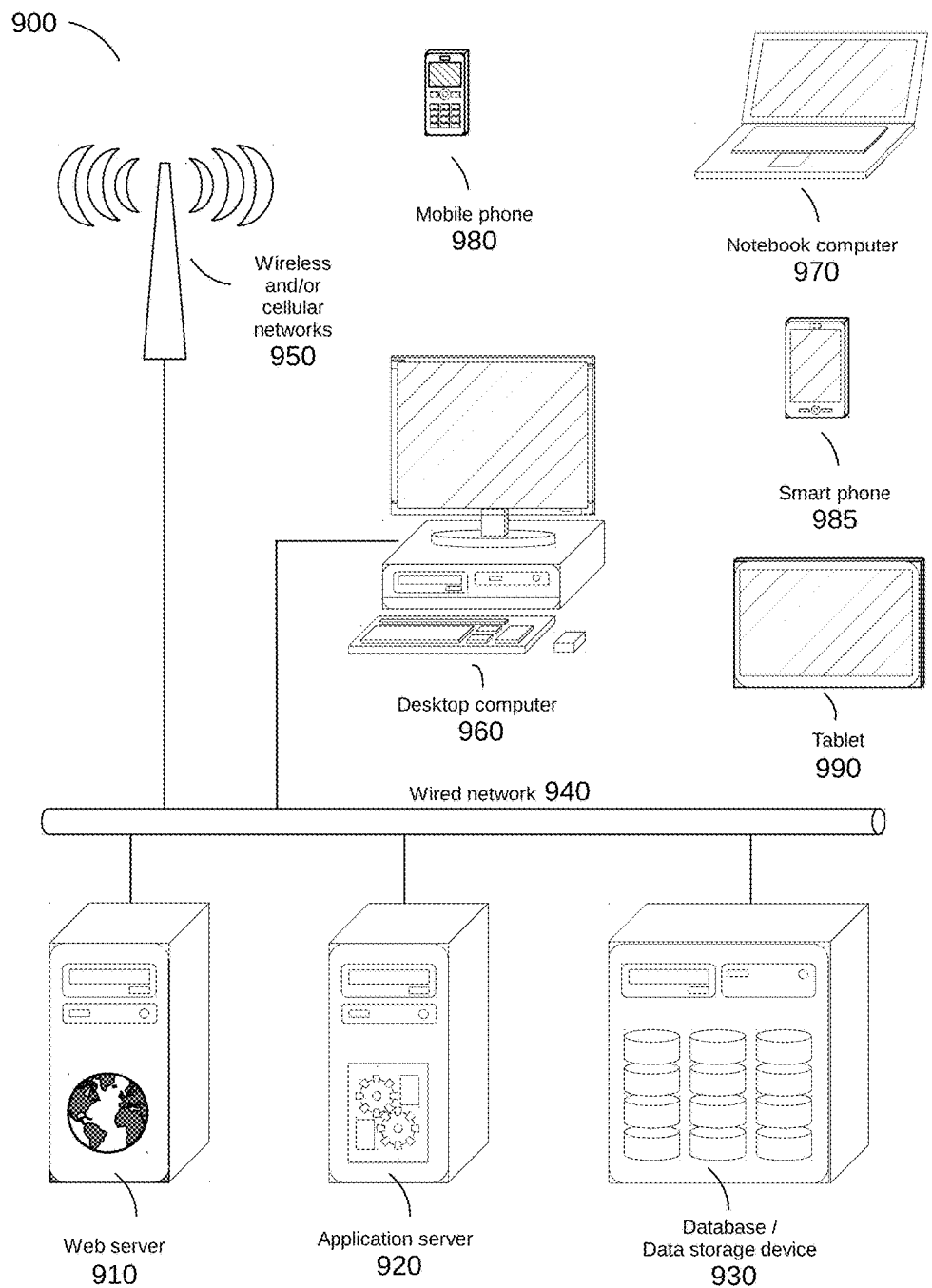
FIG. 9 illustrates an example system capable of implementing embodiments of the invention.

FIG. 9 illustrates a system suitable for implementing embodiments of the invention. FIG. 9 shows an example computer and network system architecture 900 suitable for implementing embodiments of the invention. The system includes the following user computers, which may be client computers including a GUI: desktop computer 960, notebook computer 970, mobile phone 980, smart phone 985, and tablet 990. The system can interface with any type of electronic device, such as a thin-client computer, internet-enabled mobile telephone, mobile internet access device, tablet, electronic book, or personal digital assistant, capable of displaying and navigating web pages or other types of electronic documents. Although the system is shown with five user computers, any number of user computers can be supported. User computers 960-690 and other electronic devices can act as client systems using host servers included in system 900.

A web server 910 is used to process requests from web browsers and standalone applications for web pages, electronic documents, enterprise data or other content, and other data from the user computers. Web server 910 may also provide a menu application, as well as syndicated content, such as RSS or Atom feeds, of data related to enterprise operations.

Application server 920 operates one or more mobile applications. The mobile applications can be implemented as one or more scripts or programs written in any programming language, such as Java, C, C++, C#, or any scripting language, such as JavaScript or ECMAScript, Perl, PHP, Python, Ruby, or TCL. Data applications can be built using libraries or application frameworks, such as Rails, Enterprise JavaBeans, or .NET.

The data applications on application server 920 process input data and user computer requests and can store or retrieve data from database/data storage device 930. Database/data storage device 930 stores data created and used by the data applications. In an embodiment, the database/data storage device 930 includes a relational database, such as MySQL, that is adapted to store, update, and retrieve data in response to SQL format commands. In other embodiments, unstructured data storage architectures and NoSQL databases may also be used.

In an embodiment, application server 920 includes one or more general-purpose computers capable of executing programs or scripts. In an embodiment, web server 910 is implemented as an application running on one or more general-purpose computers. The web server and application server may be combined and executed on the same computer(s).

An electronic communication network enables communication between user computers 960-990, web server 910, application server 920, and database/data storage device 930. In an embodiment, the electronic communication network may further include any form of electrical or optical communication devices, including wired network 940 and wireless network 950. The electronic communication network may also incorporate one or more local-area networks, such as an Ethernet network; enterprise networks, wide-area networks, such as internet and cellular carrier data networks; and virtual networks, such as a virtual private network.

The system is one example for executing mobile applications according to an embodiment of the invention. In another embodiment, application server, web server, and optionally database can be combined into a single server computer application and system. In a further embodiment, virtualization and virtual machine applications may be used to implement one or more of the application server, web server, and database. In still further embodiments, all or a portion of the web server and application functions may be integrated into an application running on each of the user computers. For example, a JavaScript application on the user computer may be used to retrieve or analyze data and display portions of the applications.

Although the description has been described with respect to particular embodiments thereof, these particular embodiments are merely illustrative, and not restrictive. For example, all figures depict two-dimensional tables, with a left-to-right and a top-to-bottom convention. Embodiments of the invention support tables with any number of dimensions, with left-to-right or right-to-left convention, and with top-to-bottom or bottom-to-top convention. Styles of data cells, headers, footers, and corner cells are shown as limited to background hatching, font weight, and thickness of the cell border lines. However, embodiments of the invention support any formatting options known in the art, including background color, background hatching, background shading, background gradients, border line colors and dashing, font, font style, font size, font effects, font position, font color (or foreground color), underlining, overlining, text alignment (horizontal and vertical), indentation, wrapping, text orientation, data type limitations, data value limitations, protection, and data hiding or data cell window hiding. Further, the example figures show static data, or data that can change upon user interaction. However, each of a data cell, a header, a footer, and a corner cell may have volatile data coming from an external data stream, or from an internal data generator such as a random number generator. All such variations are within the scope and ambit of embodiments of the invention.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a tangible, non-transitory computer-readable information storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments. For example, a tangible, non-transitory computer-readable information storage medium such as a hardware storage device can be used to store the control logic, which can include executable instructions.

Particular embodiments may be implemented by using a programmed general-purpose digital computer, by using application specific integrated circuits, programmable logic devices, field programmable gate arrays, optical, chemical, biological, quantum or nano-engineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method for creating a data grid software component for display in a graphical user interface (GUI) on a computer's screen, the method comprising:

(a) creating a software class including a container window, wherein:
  (i) the software class is configured to include two or more data cell windows, displayable in a grid organization in the container window;
  (ii) each data cell window is included in a data cell;
  (iii) a first data cell includes a first style property to define a first display style of a first data cell window included in the first data cell;
  (iv) the first style property is configured to include one or more of a first individual value and a first template value; and
  (v) the first data cell window is configured for displaying a first data value included in the first data cell and for receiving user inputs to modify the first data value;
  (vi) the software class includes a header configured to include a third software component, wherein the header:
    A. is associated with one of a row and a column;
    B. includes two or more levels, with a first level matching a granularity of single data cells, and a second level matching a granularity spanning multiple data cells;
    and wherein the third software component is configured to show and interact with one or more of a date, a time, a graph, a chart, a bitmap, streaming graphics, and a streaming bitmap; and wherein display data is received or retrieved from one or more of a software program, a database, a data file, and a data stream;
(b) on the computer, instantiating a data grid object from the software class; and
(c) populating the data grid object with two or more data cell windows to show at least two data values and displaying the data grid object in the GUI.

2. The method of claim 1, wherein the software class further comprises a footer that includes one or more of a text caption and a second software component and wherein the footer is associated with one of a row and a column.

3. The method of claim 2, wherein the second software component is configured to show and interact with one or more of a text, a date, a time, a graph, a chart, a bitmap, streaming graphics, and a streaming bitmap; and wherein display data is received or retrieved from one or more of a software program, a database, a data file, and a data stream.

4. The method of claim 2, wherein the footer includes a footer style property configured to include one or more of an individual footer style value and a template footer style value.

5. The method of claim 4, wherein the individual footer style value overrides the template footer style value.

6. The method of claim 2, wherein the footer includes two or more levels, with a first level matching a granularity of single data cells, and a second level matching a granularity spanning multiple data cells.

7. The method of claim 6, wherein the first level includes a first footer style property and the second level includes a second footer style property, each including one or more of an individual footer style value and a template footer style value.

8. The method of claim 1, wherein the header includes a header style property configured to include one or more of an individual header style value and a template header style value.

9. The method of claim 8, wherein the individual header style value overrides the template header style value.

10. The method of claim 1, wherein the first level includes a first header style property and the second level includes a second header style property, each including one or more of an individual header style value and a template header style value.

11. The method of claim 1, wherein the software class further comprises a corner cell configured to include one or more of a text caption and a fourth software component.

12. The method of claim 11, wherein the fourth software component is configured to show and interact with one or more of a text, a date, a time, a graph, a chart, a bitmap, streaming graphics, and a streaming bitmap; and wherein display data is received or retrieved from one or more of a software program, a database, a data file, and a data stream.

13. The method of claim 11, wherein the corner cell includes a corner cell style property configured to include one or more of an individual corner cell style value and a template corner cell style value.

14. The method of claim 13, wherein the individual corner cell style value overrides the template corner cell style value.

15. The method of claim 1, wherein a second data cell is configured to include one or more of a text caption and a fifth software component, and wherein the fifth software component is configured to show and interact with one or more of a date, a time, a graph, a chart, a bitmap, streaming graphics, and a streaming bitmap; and wherein display data is received or retrieved from one or more of a software program, a database, a data file, and a data stream.

16. The method of claim 1, wherein the data grid object includes a third data cell window adapted to show and interact with one or more of text, a date, a time, a graph, a chart, a bitmap, streaming graphics, and a streaming bitmap; and wherein cell data is received or retrieved from one or more of a software program, a database, a data file, and a data stream.

17. A tangible, non-transitory computer-readable information storage medium including instructions adapted to direct a computer to display a data grid software component in a GUI, comprising:
  (a) on the computer, instantiating a data grid software component object from a software class, wherein the software class includes a container window, and wherein:
    (i) the software class is configured to include two or more data cell windows, displayable in a grid organization in the container window;
    (ii) each data cell window is included in a data cell;
    (iii) a first data cell includes a first style property to define a first display style of a first data cell window included in the first data cell;
    (iv) the first style property is configured to include one or more of a first individual value and a first template value; and
    (v) the first data cell window is capable of configured for displaying a first data value included in the first data cell;
    (vi) the software class includes a header configured to include a second software component, wherein the header:
      A. is associated with one of a row and a column;
      B. includes two or more levels, with a first level matching a granularity of single data cells, and a second level matching a granularity spanning multiple data cells;
    and wherein the second software component is configured to show and interact with one or more of a date, a time, a graph, a chart, a bitmap, streaming graphics, and a streaming bitmap; and wherein display data is received or retrieved from one or more of a software program, a database, a data file, and a data stream; and (b) populating the data grid software component object with two or more data cell windows to show at least two data values and displaying the data grid software component object in the GUI.

18. A system comprising:

a client computer including a GUI;

a database storing data; and an application server connected with the database and the client computer via at least one network, wherein the application server is adapted to retrieve the data from the database and communicate the retrieved data to the client computer;

wherein the client computer includes a software program including instructions executable by the client computer to perform a method, the method comprising:

(a) on the client computer, instantiating a data grid software component object from a software class, wherein the software class includes a container window, and wherein:

(i) the software class is configured to include two or more data cell windows, displayable in a grid organization in the container window;

(ii) each data cell window is included in a data cell;

(iii) a first data cell includes a first style property to define a first display style of a first data cell window included in the first data cell;

(iv) the first style property is configured to include one or more of a first individual value and a first template value; and (v) the first data cell window is configured for displaying a first data value included in the first data cell;

(vi) the software class includes a header configured to include a second software component, wherein the header:

A. is associated with one of a row and a column;

B. includes two or more levels, with a first level matching a granularity of single data cells, and a second level matching a granularity spanning multiple data cells;

and wherein the second software component is configured to show and interact with one or more of a date, a time, a graph, a chart, a bitmap, streaming graphics, and a streaming bitmap; and wherein display data is received or retrieved from one or more of a software program, a database, a data file, and a data stream; and (b) populating the data grid software component object with two or more data cell windows to show at least two data values and displaying the data grid software component object in the GUI.

* * * * *

UNITED STATES PATENT AND TRADEMARK OFFICE
CERTIFICATE OF CORRECTION

PATENT NO. : 10,229,103 B2
APPLICATION NO. : 15/247857
DATED : March 12, 2019
INVENTOR(S) : Rullan et al.

Page 1 of 1

It is certified that error appears in the above-identified patent and that said Letters Patent is hereby corrected as shown below:

In the Claims

In Column 13, Line 39, in Claim 2, delete "component" and insert -- component, --, therefor.

In Column 14, Line 54, in Claim 17, delete "is capable of" and insert -- is --, therefor.

Signed and Sealed this
Twenty-fifth Day of February, 2020

Andrei Iancu
*Director of the United States Patent and Trademark Office*